United States Patent
Muramatsu et al.

(10) Patent No.: US 7,350,776 B2
(45) Date of Patent: Apr. 1, 2008

(54) FLUID-FILLED TYPE VIBRATION-DAMPING DEVICE

(75) Inventors: Atsushi Muramatsu, Komaki (JP); Hajime Maeno, Kasugai (JP); Mutsumi Muraoka, Kasugai (JP); Hironori Koyama, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 232 days.

(21) Appl. No.: 11/370,872

(22) Filed: Mar. 9, 2006

(65) Prior Publication Data

US 2006/0208405 A1    Sep. 21, 2006

(30) Foreign Application Priority Data

Mar. 16, 2005  (JP) .............................. 2005-075863

(51) Int. Cl.
    *F16F 13/26*    (2006.01)
    *B60K 5/12*    (2006.01)
(52) U.S. Cl. ........................... 267/140.14; 267/140.15; 267/219
(58) Field of Classification Search ........... 267/140.13, 267/140.14, 140.15, 218, 219
    See application file for complete search history.

(56) References Cited

U.S. PATENT DOCUMENTS 4,711,206 A    12/1987  Andrä et al.
6,176,477 B1 *  1/2001  Takeo et al. ........... 267/140.14
6,224,045 B1    5/2001  Muramatsu et al.
2007/0138718 A1 *  6/2007  Muraoka ............... 267/140.14

FOREIGN PATENT DOCUMENTS

JP          05018433 A  *  1/1993
JP          A 11-264436    9/1999

* cited by examiner

*Primary Examiner*—Thomas Williams
(74) *Attorney, Agent, or Firm*—Oliff & Berridge, PLC

(57) ABSTRACT

A fluid-filled type vibration-damping device having an elastic rubber film partially defining a primary fluid chamber at one surface and partially defining a pressure action chamber. The pressure action chamber varies its pressure under control so that the elastic rubber film changes its elasticity to change damping characteristics of the device. To give sufficient recovery force for the elastic rubber film, the elastic rubber film includes a plurality of thick reinforcing ribs circumferentially spaced apart from one another and extending in a radial direction from an outside peripheral edge over a length not reaching a center so that areas situated between pairs of adjacent reinforcing ribs constitutes thin portions formed by a thin rubber elastic body, while the center portion of the elastic rubber film situated between distal ends constitutes a bowed center portion thinner than the reinforcing ribs and convex towards the pressure action chamber.

9 Claims, 4 Drawing Sheets

FLUID-FILLED TYPE VIBRATION-DAMPING DEVICE

INCORPORATED BY REFERENCE

The disclosure of Japanese Patent Application No. 2005-075863 filed on Mar. 16, 2005 including the specification, drawings and abstract is incorporated herein by reference in its entirety.

BACKGROUND OF THE INVENTION

1. Field of the Invention

The present invention relates generally to a fluid-filled type vibration-damping device for connecting in a vibration-damping fashion a vibration damping member with a member to be vibration-damped. More particularly, the invention is concerned with a fluid-filled type vibration-damping device having a flexible film as a fluid pressure absorbing mechanism.

2. Description of the Related Art

Rubber vibration dampers having a first mounting member and a second mounting member connected by a main rubber elastic body are widely employed in a variety of fields as vibration-damped connectors or vibration-damped supports for installation between members making up a vibration transmission system. As one type of rubber vibration damper of this kind, there have been proposed fluid-filled type vibration-damping devices that utilize resonance or other flow action of a non-compressible fluid sealed within the device. As such devices, there are known fluid-filled type vibration-damping devices that typically comprise: a first mounting member and a second mounting member attached respectively to a vibration-damped member and connected to each other by a main rubber elastic body; a pressure-receiving chamber whose wall is partially constituted by the main rubber elastic body and that gives rise to pressure fluctuations upon input of vibration; an equilibrium chamber whose wall is constituted by a flexible film and which allows change in volume; a non-compressible fluid sealed within the pressure-receiving chamber and the equilibrium chamber; and an orifice passage permitting a fluid communication between the two chambers.

With such fluid-filled type vibration-damping devices, it is possible to achieve high vibration damping capability in the frequency range to which the orifice passage has been previously tuned. However, upon input of vibrations in a frequency range higher than the tuning frequency, the orifice passage becomes substantially blocked off, which can result in considerably increased dynamic spring constant, thereby making it difficult to exhibit adequate vibration damping performance.

In order to handle vibrations in a frequency range higher than the tuning frequency of the orifice passage, there has been proposed a fluid-filled type vibration-damping device having a flexible, movable film disposed within the pressure-receiving chamber or an intermediate chamber that communicates with the pressure-receiving chamber through an orifice passage. In this fluid-filled type vibration-damping device, fluctuations in fluid pressure caused by medium- to high-frequency vibration is absorbed through elastic deformation of the movable rubber film, so that the system can handle vibration in a frequency range higher than the tuning frequency of the orifice passage.

In a fluid-filled type vibration-damping device having a movable rubber film, there is a risk that elastic deformation of the movable rubber film may also absorb even pressure fluctuations produced within the pressure-receiving chamber during input of vibration of the frequency range to which the orifice passage is tuned. As a result, vibration-damping capability based on fluid flow through the orifice passage may be diminished.

To address this problem, there have been proposed pneumatic dynamic vibration damping devices like that taught in JP-A-11-264436, wherein a movable rubber film (movable rubber plate) is disposed so as to define at one face within the pressure-receiving chamber or equilibrium chamber with non-compressible fluid sealed therein, and to define at the other face an air chamber. This arrangement makes it possible to control elastic deformation of the movable rubber film by controlling the pressure within the air chamber from the outside.

More specifically described, in the case of input of vibration in the frequency band to which the orifice passage has been previously tuned, negative pressure acts on the air chamber and suctions the movable rubber film, thus impeding its elastic deformation and displacement. Whereas in the case of input of vibration of a higher frequency than the tuning frequency of the orifice passage, the air chamber is maintained at substantially atmospheric pressure so as to permit elastic deformation and displacement of the movable rubber film to absorb fluid pressure associated with input of vibration.

Extensive studies conducted by the inventors, however, has revealed that the use of such a movable rubber film creates a new problem. That is, where the movable rubber film is made sufficiently pliable with reference to the required characteristics of the movable rubber film in order to produce a low dynamic spring constant, the movable rubber film may suffer from insufficient elasticity. In this state, the movable rubber film does not recover its original shape prior to suction after the suction created by the negative pressure is released, and cannot exhibit the desired performance.

Additionally, where a fluid-filled type vibration-damping device like those described above is employed in an automobile or the like, it is typical to employ the exhaust system of the internal combustion engine as the means for controlling pressure in the air chamber. However, since there is backflow of gas and oil from the combustion chamber end into the air intake passage of the internal combustion engine, there is a risk that gas or oil will flow into the air chamber of the fluid-filled type vibration-damping device. Thus, oil resistance is required of the movable rubber film which makes up part of the wall of the air chamber, making it preferable to use as the material for the movable rubber film a material such as containing added hydrogen in order to meet the requirement of oil resistance. However, movable rubber films produced from such materials are relatively stiff, and where it is attempted to impart the desired characteristics, it becomes difficult to provide thickness adequate to ensure a sufficient level of durability.

On the other hand, where the movable rubber film using materials like those described above to impart oil resistance and thickness sufficient to ensure durability, the movable rubber film becomes highly rigid, which not only makes it difficult to meet the requirement of low spring characteristics. In addition, due to the lower pliability also poses a risk of rupture or other damage due to repeated elastic deformation by negative pressure suction. Accordingly, there is a great demand for a fluid-filled type vibration-damping device furnished with a movable rubber film that simultaneously achieves sufficient rigidity, oil resistance, and durability.

SUMMARY OF THE INVENTION

It is an object of the present invention to provide a fluid-filled vibration damping device including a movable rubber film in the form of an elastic rubber film having satisfactory low dynamic spring characteristics and exhibited excellent vibration damping capability, and endowed with recovery force enabling it to easily recover to its original shape, while also achieving durability.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled type vibration-damping device for elastically connecting two components making up a vibration transmission system in a vibration damping fashion, the device comprising: a first mounting member adapted to be attached to one of the two components; a second mounting member adapted to be attached to an other one of the two components; a main rubber elastic body elastically connecting the first and second mounting members; a primary fluid chamber whose wall is partially constituted by the main rubber elastic body having a non-compressible fluid sealed therein; an auxiliary fluid chamber whose wall is partially constituted by a flexible film having the non-compressible fluid sealed therein; a partition member supported by the second mounting member and positioned such that the primary fluid chamber and the auxiliary fluid chamber are disposed on either side thereof; an orifice passage for permitting a fluid communication between the primary and auxiliary fluid chambers; and an elastic rubber film partially defining the wall of the primary fluid chamber at one of opposite surfaces thereof, and partially defining a pressure action chamber at an other one of opposite surfaces thereof, the elastic rubber film being varied in a rigidity by means of negative pressure acting on the pressure action chamber, wherein the elastic rubber film is of generally disk shape and bonded at an outer circumferential surface thereof to a fastener sleeve by vulcanization, the fastener sleeve being fastened to the partition member in order to form the pressure action chamber between the partition member and the elastic rubber film, and wherein the elastic rubber film includes a plurality of thick reinforcing ribs that are spaced apart from one another in a circumferential direction and extend in a radial direction from an outside peripheral edge over a length not reaching a center so that areas situated between pairs of adjacent reinforcing ribs in the circumferential direction constitutes thin portions formed by a thin rubber elastic body, while the center portion of the elastic rubber film situated between distal ends of the plurality of reinforcing ribs constitutes a bowed center portion that is thinner than the reinforcing ribs and convex towards a pressure action chamber side.

In a fluid-filled type vibration-damping device constructed in accordance with this mode, flexible thin portions and a bowed center portion which are composed of thin rubber elastic body are formed in some portions of the elastic rubber film, and reinforcing ribs are formed in some other portions of the elastic rubber film by making it thicker.

With this arrangement, when the pressure action chamber is at generally atmospheric pressure, effective fluid pressure absorbing action can be achieved through elastic deformation of the thin portions and the bowed center portion, whereas when negative pressure is caused to act on the pressure action chamber to suction and constrain the elastic rubber film towards the pressure action chamber side, the reinforcing ribs effectively prevent the thin portions and the bowed center portion from being pulled excessively towards the pressure action chamber side, thereby advantageously avoiding damage to the elastic rubber film due to excessive elastic deformation, whereby improved durability of the elastic rubber film may be achieved.

Additionally, by supporting the outer peripheral end portions of the reinforcing ribs by fastening them to the fastener sleeve, while having the plurality of reinforcing ribs spaced apart from one another at the diametrically center ends thereof and connected to one another by the thin bowed center portion, the reinforcing ribs are supported in cantilever fashion, and are able to undergo displacement relatively easily at their diametrically center ends. Thus, elastic deformation of the thin portions and the bowed center portion is not impaired by forming the reinforcing ribs, and ample fluid pressure absorbing effect may be achieved.

Further, it is necessary that the elastic rubber film have recovery force sufficient to quickly resume its original shape once negative pressure has been released. This recovery force is advantageously afforded by the reinforcing ribs. That is, since the reinforcing ribs are cantilevered, they will undergo bowing deformation when suctioned by negative pressure, but when the negative pressure is released, the reinforcing ribs will immediately recover their original shape due to their higher rigidity as compared to the thin portions. Since the reinforcing ribs are also connected to the thin portions and the bowed center portion, when the reinforcing ribs recover their original shape, in association therewith the thin portions and the bowed center portion will likewise recover their condition prior to being suctioned by negative pressure. By means of this design, substantially no recovery force will be required in the flexible portions of the elastic rubber film, i.e. the thin portions and the bowed center portion, thus in these portions there is no need to ensure thickness dimension sufficient to produce such recovery force, thereby allowing these portions to be made sufficiently thin and imparted with improved flexibility. Consequently, despite its relatively high rubber stiffness, it becomes possible to advantageously employ acrylonitrile-butadiene rubber (NBR) with added hydrogen as the material for the thin portions and the bowed center portion, since it can be thinned to give it higher flexibility, thereby making it possible to achieve an elastic rubber film that is endowed both with high oil resistance and flexibility.

Additionally, since the bowed center portion is imparted with a bowed shape that is convex towards the pressure action chamber side, the bowed center portion (which deforms readily as compared to the reinforcing ribs) undergoes rapid elastic deformation when suctioned by negative pressure, so that the distal ends of the reinforcing ribs are drawn towards the pressure action chamber side in association with the elastic deformation of the bowed center portion, the reinforcing ribs are made to undergo ample elastic deformation, so that when the negative pressure is released, the elastic rubber film will immediately recover its original shape due to the repulsive force of the reinforcing ribs.

A second mode of the invention provides a fluid-filled type vibration-damping device according to the first mode, wherein in the elastic rubber film, the areas situated between pairs of adjacent reinforcing ribs in the circumferential direction have a thick center portion in a generally center portion thereof, which is surrounded by a thinner portion.

In the fluid-filled type vibration-damping device constructed according to this mode, the formation of these thick center portions makes it possible to regulate elastic deformation in the center portions of the thin portions (which are prone to undergo excessive elastic deformation), thereby effectively preventing these portions from being drawn excessively towards the pressure action chamber side. Additionally, by forming thick center portions, thin portions are formed surrounding the thick center portions, and the thick portions, i.e., the thick center portions, the outside peripheral edge portion of the elastic rubber film, and the reinforcing ribs, are intersticed by the thin portions, thereby effectively preventing excessive elastic deformation.

Particularly in cases where the thick center portion is situated at an opening for introducing negative pressure into the pressure action chamber, due to the fact that the center thick portion is thicker than the thin portion and does not readily undergo elastic deformation, it is possible to advantageously prevent the elastic rubber film from being drawn into the opening.

A third mode of the invention provides a fluid-filled type vibration-damping device according to the first or second mode, wherein the reinforcing ribs are formed inclining towards a pressure-receiving chamber side, with substantially unchanging thickness towards a center from an outside peripheral edge of the elastic rubber film.

In the fluid-filled type vibration-damping device constructed according to this mode, from the outset the reinforcing ribs are formed so as to incline towards the pressure-receiving chamber side, making it possible to more advantageously achieve recovery force when the elastic rubber film is no longer subjected to negative pressure suction towards the pressure action chamber side, so that prompt control of film rigidity of the elastic rubber film can be carried out consistently.

A fourth mode of the invention provides a fluid-filled type vibration-damping device according to any of the first to third modes further comprising an air pressure controller including an air pressure passage formed opening into the pressure action chamber, and adapted to selectively expose the pressure action chamber to atmospheric pressure or negative pressure through the air pressure passage.

A fifth mode of the invention provides a fluid-filled type vibration-damping device according to any one of the first to fourth modes wherein the second mounting member is of tubular shape, and the first mounting member is situated spaced apart from a first open end of the second mounting member, with the first and second mounting members connected to each other by the main rubber elastic body thereby providing fluid-tight closure to the first open end of the second mounting member; an other open end of the second mounting member is provided fluid-tight closure by the flexible film; and the partition member is of generally bottomed, round tubular shape disposed opening towards the first mounting member side, with the elastic rubber film disposed in an interior thereof to form the pressure action chamber at a bottom of the partition member, and with an outside peripheral portion of the partition member extending in the circumferential direction to form the orifice passage.

A sixth mode of the invention provides a fluid-filled type vibration-damping device according to any one of the first to fourth modes, wherein the partition member includes a first partition member and a second partition member, with the primary fluid chamber and the auxiliary fluid chamber being formed to either side of the first partition member, and the primary fluid chamber being partitioned by the second partition member, thereby forming a pressure-receiving chamber whose wall is partially constituted by the main rubber elastic body and in which pressure fluctuations are created during vibration input, and an intermediate chamber whose wall is partially constituted by the elastic rubber film; the primary fluid chamber is constituted by the pressure-receiving chamber and the intermediate chamber; the auxiliary fluid chamber is constituted by an equilibrium chamber whose wall is partially constituted by the flexible film and which readily permits change in volume; and the orifice passage is formed by a first orifice passage connecting the pressure-receiving chamber with the equilibrium chamber and a second orifice passage connecting the pressure-receiving chamber with the intermediate chamber.

In a fluid-filled type vibration-damping device constructed according to this mode, it is possible to more advantageously exhibit vibration damping capability of a wider frequency range.

A seventh mode of the invention provides a fluid-filled type vibration-damping device according to the sixth mode wherein the second mounting member is of tubular shape, and the first mounting member is situated spaced apart from a first open end of the second mounting member, with the first and second mounting members connected to one another by the main rubber elastic body thereby providing fluidtight closure to the first open end of the second mounting member; the other open end of the second mounting member is provided fluidtight closure by the flexible film; the first partition member is of generally bottomed, round tubular shape disposed opening towards the first mounting member side, with the elastic rubber film disposed in an interior thereof to form the pressure action chamber at a bottom of the first partition member; the second partition member is disposed on an opposite side of the elastic rubber film from the pressure action chamber; an outside peripheral portion of the first partition member extends in the circumferential direction to form the first orifice passage; and the outside peripheral portion of the second partition member extends in the circumferential direction to form the second orifice passage.

An eighth mode of the invention provides a fluid-filled type vibration-damping device according to any of the first to fourth modes wherein the primary fluid chamber is partitioned by a movable member having limited displacement and deformation, thereby forming a pressure-receiving chamber a portion of whose wall is constituted by the main rubber elastic body and in which pressure fluctuations are produced directly in association with elastic deformation of the main rubber elastic body when vibration is input, and an intermediate chamber a portion of whose wall is constituted by the elastic rubber film and in which pressure fluctuations are produced by pressure in the pressure-receiving chamber being exerted upon it by the movable member when vibration is input; the primary fluid chamber is constituted by the pressure-receiving chamber and the intermediate chamber; there is formed an equilibrium chamber a portion of whose wall is constituted by the flexible film and which readily permits change in volume, with the auxiliary fluid chamber being constituted by the equilibrium chamber; and the orifice passage is formed by a first orifice passage connecting the pressure-receiving chamber with the equilibrium chamber and a second orifice passage connecting the intermediate chamber with the equilibrium chamber.

In a fluid-filled type vibration-damping device constructed according to this mode, it is possible to achieve high levels of vibration damping against vibration of low to high frequency ranges.

A ninth mode of the invention provides a fluid-filled type vibration-damping device according to the eighth mode wherein the second mounting member is of tubular shape, and the first mounting member is situated spaced apart from a first open end of the second mounting member, with the first and second mounting members connected to one another by the main rubber elastic body thereby providing fluid-tight closure to the first open end of the second mounting member; the other open end of the second mounting member is provided fluid-tight closure by the flexible film; the partition member is of generally bottomed, round tubular shape disposed opening towards the first mounting member side, with the elastic rubber film disposed in the interior thereof to form the pressure action chamber at the bottom of the partition member; the movable member is disposed on the opposite side of the elastic rubber film from the pressure action chamber; and the outside peripheral portions of the elastic rubber film and the movable member extend in the circumferential direction to form the first orifice passage and the second orifice passage.

As will be apparent from the preceding description, in fluid-filled type vibration-damping devices constructed according to the present invention, the elastic rubber film can be made sufficiently thin to impart to it outstanding flexibility, while at the same time ensuring adequate durability of the elastic rubber film. Accordingly, vibration damping effect can be advantageously achieved based on absorption of fluid pressure through elastic deformation of the elastic rubber film and of resonance of fluid induced to flow through the orifice passage. The elastic rubber film may be imparted with ample recovery force. The film rigidity of the elastic rubber film can be controlled rapidly and reliably by means of negative pressure exerted on the pressure action chamber.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
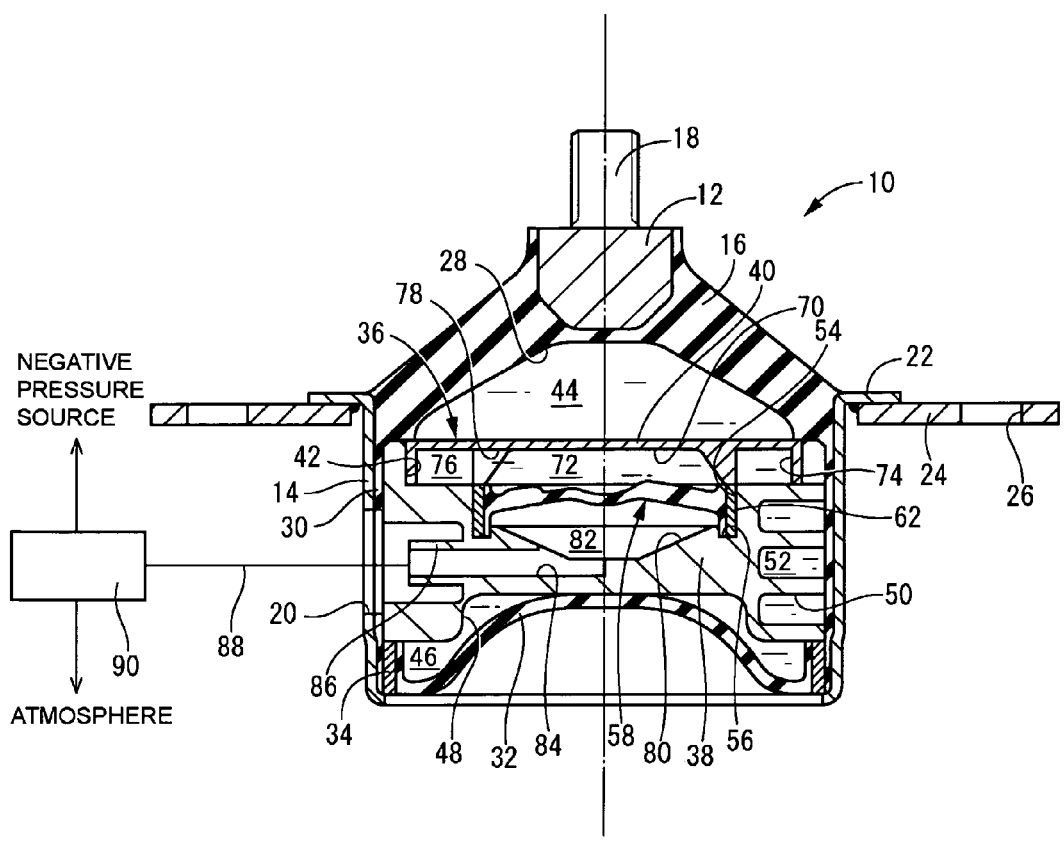
FIG. 1 is an elevational view in axial or vertical cross section of an engine mount of construction according to a first embodiment of the invention, taken along line 1-1 of FIG. 2.

Referring first to FIG. 1, there is shown a fluid-filled vibration-damping device in the form of an automotive engine mount 10 as a first embodiment of the invention. The engine mount 10 is constructed of a first mounting member 12 of metal and a second mounting member 14 of metal, connected together by a main rubber elastic body 16. The engine mount 10, in cooperation with another engine mount not shown in the drawings, supports a power unit on a body of the vehicle in a vibration damped manner, with the first mounting member 12 attached to the power unit side and the second mounting member 14 attached to the body side. In the installed state, the engine mount 10, in association with elastic deformation of the main rubber elastic body 16 due to input of the distributed load of the power unit, undergoes relative displacement of the first mounting member 12 and the second mounting member 14 so that these move closer to one another a certain amount in the vertical direction in FIG. 1. The principal vibration to be damped is input across the first mounting member 12 and the second mounting member 14, in the generally vertical direction in FIG. 1. With the engine mount 10 of this embodiment in the installed state, as depicted in FIG. 1, the center axis of the mounting (center axes of the first and second mounting members 12, 14) lies in the generally vertical direction, and thus in the description hereinbelow the vertical direction in FIG. 1 shall be designated as the vertical direction.

Described more specifically, the first mounting member 12 has a generally circular block shape, and an upwardly extending fastener bolt 18 is formed on its center axis. The fastener bolt 18 is threaded into a bolt hole, not shown, formed in a bracket or other such mounting member in the power unit (not shown) to attach the first mounting member 12 to the power unit side.

The second mounting member 14 has a large-diameter, thin-walled round tubular shape, and is perforated in the axis-perpendicular direction by an air pressure inlet hole 20 formed on one side in the radial direction. The upper end constitutes a flange 22 that spreads diametrically outward. The lower face of this flange 22 is superimposed against the inside peripheral side of the upper face of a connector fitting 24 of metal and fastened therewith by welding. The connector fitting 24 has bolt holes 26 formed at multiple locations in the circumferential direction. The second mounting member 14 is press-fit into a bracket fitting (not shown), and the connector fitting 24 is likewise fastened with bolts, not shown, to attach the second mounting member 14 to the bracket fitting.

The second mounting member 14 is attached to the vehicle body side by assembly to a tubular bracket fitting (not shown) and mounting this bracket fitting is mounted onto the vehicle body, or some similar arrangement. The first mounting member 12 is situated spaced apart above the large-diameter portion of the second mounting member 14 on the approximate center axis thereof, with the main rubber elastic body 16 disposed between the first mounting member 12 and the second mounting member 14.

The main rubber elastic body 16 has a large-diameter, generally frustoconical shape, and is provided with a large-diameter recess 28 of inverted conical shape opening onto its large-diameter end face. With the first mounting member 12 inserted downward in the axial direction from the small-diameter end face of the main rubber elastic body 16, it is vulcanization bonded to the main rubber elastic body 16 while positioned coaxially therewith. The outside circumferential surface of the large-diameter end of the main rubber elastic body 16 is vulcanization bonded to the inside circumferential surface at the upper end of the second mounting member 14. That is, the main rubber elastic body 16 is formed as an integrally vulcanization molded component furnished with the first mounting member 12 and the second mounting member 14. With this arrangement, the first mounting member 12 and the second mounting member 14 are positioned generally coaxially on a center axis extending in the principal direction of input of vibration to be damped, and are disposed spaced apart from one another while being elastically connected by the main rubber elastic body 16. The second mounting member 14 is affixed to the main rubber elastic body 16, whereby the opening at one end of the second mounting member 14 (the upper end in FIG. 1) is closed off fluid tightly by the main rubber elastic body 16. The inside circumferential surface of the second mounting member 14 in the axial lower end portion thereof below the axial medial portion is covered over its entirety by a seal rubber layer 30 integrally formed with the main rubber elastic body 16.

At the opening on the other end (the lower end in FIG. 1) of the second mounting member 14, on the other hand, there is attached a diaphragm 32 serving as a flexible film. The diaphragm 32 is constituted by a rubber elastic film of thin, generally disk shape imparted with sufficient slack in its center portion. To the outside peripheral edge portion of the diaphragm 32 is bonded by vulcanization a fastener fitting 34 of large-diameter, generally annular shape. The fastener fitting 34 is covered on its inside circumferential surface by the outside peripheral edge of the diaphragm 32, while its outside circumferential surface is juxtaposed against the inside circumferential surface at the lower end of the second mounting member 14, and in this state the second mounting member 14 is subjected to crimping from all directions or other such diameter reduction process, and fastened thereby to the second mounting member 14 via the interposed seal rubber layer 30, attaching the diaphragm 32 to the second mounting member 14.

With this arrangement, the area defined between the main rubber elastic body 16 and the diaphragm 32 is hermetically sealed off from the outside space. By sealing a non-compressible fluid in this area, a fluid sealed area is defined. The non-compressible fluid sealed within the fluid sealed area may be selected from water, an alkylene glycol, a polyalkylene glycol, silicone oil or the like. In terms of effectively achieving vibration damping action on the basis of flow action such as resonance action of the fluid, it is preferable to use a low-viscosity fluid having viscosity of 0.1 Pa·s or lower. Sealing of the non-compressible fluid is accomplished, for example, by performing assembly of the diaphragm 32 and a partition member 36, described later, with the main rubber elastic body 16 integrally vulcanization molded component furnished with the first and second mounting members 12, 14 while these are immersed in the non-compressible fluid.

The main rubber elastic body 16 integrally vulcanization molded component furnished with the first and second mounting members 12, 14 additionally has a partition member 36 attached to the second mounting member 14. The partition member 36 is constituted to include a partition fitting body 38 provided as a first partition member of thick-walled, generally disk shape, and a lid fitting 40 provided as a second partition member.

The partition fitting body 38 has a thick-walled, generally disk shape, and in this embodiment is fabricated of metal material such as aluminum alloy. A positioning recess 42 is formed in the diametrically center portion of the upper face thereof. This positioning recess 42 is a large-diameter circular recess that opens upward. The lid fitting 40 fits into the positioning recess 42. The lid fitting 40 is fabricated from metal material of generally disk shape and thinner than the partition fitting body 38, and is secured press-fit into the positioning recess 42 formed in the partition fitting body 38.

The lid fitting 40 and the partition fitting body 38 stacked in the axial direction are integrally inserted within the second mounting member 14, and the second mounting member 14 is subjected to crimping or bending from all directions or other such diameter reduction process, whereby they are fastened to the second mounting member 14 with the partition member 36 extending in the axis-perpendicular direction and with the outside circumferential surface of the partition fitting body 38 superimposed fluid tightly against the inside circumferential surface of the second mounting member 14 via the seal rubber layer 30 covering the inside circumferential surface of the second mounting member 14. The upper face of the fastener fitting 34 affixed to the outside peripheral edge of the diaphragm 32 is superimposed against the outside peripheral edge of the lower face of the partition fitting body 38, thereby positioning the partition member 36 and the diaphragm 32 relative to one another in the axial direction.

With this arrangement, the sealed fluid area is divided in two in the vertical direction by means of the partition member 36 extending in the axis-perpendicular direction in the interior thereof. In association with this, there is formed to one side of the partition member 36 in the axial direction (the upper side in FIG. 1) a pressure-receiving chamber 44 a portion of whose wall is constituted by the main rubber elastic body 16 and that gives rise to pressure fluctuations in association with elastic deformation of the main rubber elastic body 16 when vibration is input across the first mounting member 12 and the second mounting member 14. To the other side of the partition member 36 in the axial direction (the lower side in FIG. 1), there is formed an equilibrium chamber 46 that readily permits change in volume on the basis of elastic deformation of the diaphragm 32. On the lower end face of the partition fitting body 38, there is formed a bottom face recess 48 that opens downward in the center portion, with sufficient volume of the equilibrium chamber 46 being assured by the bottom face recess 48.

On the outside circumferential surface of the partition fitting body 38, there is formed a sinuous circumferential groove 50 extending a prescribed length in the circumferential direction. By means of the outside circumferential surface of the partition fitting body 38 being covered fluid tightly by the second mounting member 14 via the seal rubber layer 30 that covers the inside circumferential surface of the second mounting member 14, this circumferential groove 50 forms a fluid passage constituting a first orifice passage 52.

A first end of the fluid passage constituting the first orifice passage 52 connects with the pressure-receiving chamber 44 via a hole on the pressure-receiving chamber side (not shown) bored in the axial direction through the outside peripheral portion of the lid fitting 40, and a hole communicating with the pressure-receiving chamber side (not shown) bored in the upper end of the partition fitting body 38 and aligned with the hole on the pressure-receiving chamber side. The other end of the fluid passage connects with the equilibrium chamber 46 through a hole communicating with the equilibrium chamber side (not shown) bored through the lower end of the partition fitting body 38. By means of this arrangement, the pressure-receiving chamber 44 and the equilibrium chamber 46 connect with each other by means of the first orifice passage 52 constituted to include the fluid passage, thus permitting fluid flow between the two chambers 44, 46 through the first orifice passage 52. That is, the first orifice passage 52 is formed spanning the pressure-receiving chamber 44 and the equilibrium chamber 46.

The resonance frequency of the fluid caused to flow through the first orifice passage 52 is tuned so as to produce effective vibration damping effect (high attenuating effect) of vibration in a low frequency range of about 10 Hz corresponding to engine shake and the like, on the basis of resonance action of the fluid.

In the diametrical center portion of the positioning recess 42 formed on the upper face of the partition fitting body 38, there is formed a center recess 54 smaller in size than the positioning recess 42. This center recess 54 is generally circular in shape, and the bottom face at the outside edge portion thereof is slightly deeper, forming an anchoring groove 56 having slightly greater depth dimension than the other areas.

Figure 2:
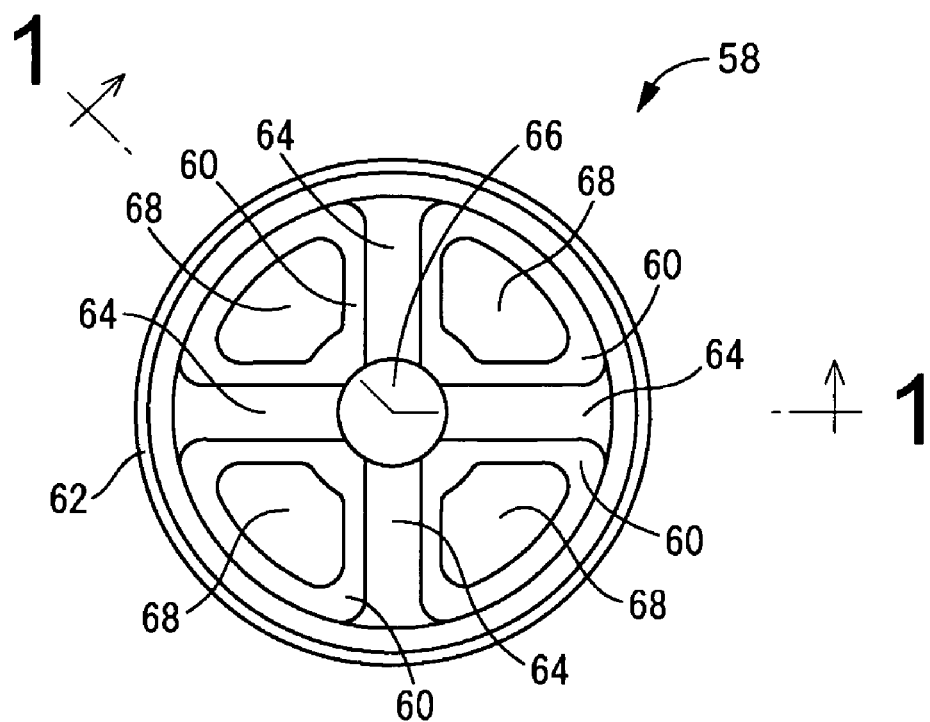
FIG. 2 is a tope plane view of a elastic rubber film of the engine mount of FIG. 1.

A movable rubber film 58 is disposed as an elastic rubber film in the center recess 54. As depicted in FIG. 2, the movable rubber film 58 is of generally disk shape overall, and has a tapered shape that, albeit slightly, is rises gradually upward in the axial direction going toward the diametrical center.

Figure 3:
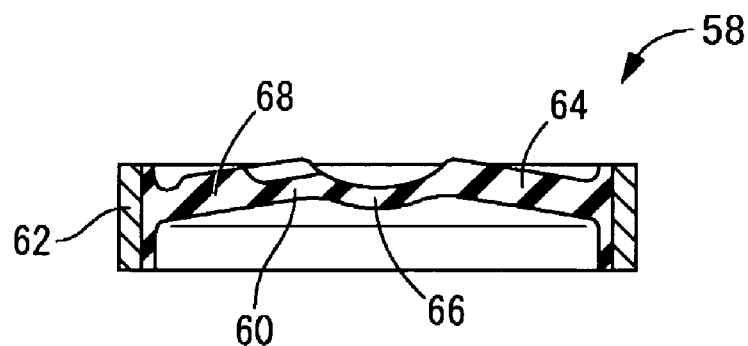
FIG. 3 is a cross sectional view of the elastic rubber film of FIG. 2.

In greater detail, as depicted in FIG. 2 and FIG. 3, the movable rubber film 58 has flexible rubber film portions 60 as its thin portions. The flexible rubber film portions 60 consist of thin rubber film of circular shape, the outside peripheral edge of which is adhered to the inside circumferential surface of a sleeve fitting 62 provided as a fastening sleeve of generally annular shape.

In each of two diametrical directions intersecting one another in the movable rubber film 58, there are integrally formed on the flexible rubber film portions 60 a pair of reinforcing ribs 64, for a total of four. The reinforcing ribs 64 are of sufficient thickness relative to the flexible rubber film portions 60, and extend diametrically inward from the diametrical outer peripheral edge of the movable rubber film 58, but are not long enough to reach the diametrical center. That is, in either one of the diametrical directions, two reinforcing ribs 64 are disposed spaced apart from each other across the center portion. The reinforcing ribs 64 slope towards the tapered face of the tapered movable rubber film 58, sloping in the diametrical direction which is their lengthwise direction. In this embodiment in particular, the reinforcing ribs 64 slope upwardly in the axial direction at their diametrically center sides, with the upper and lower faces thereof sloping at substantially the same angle of slope. Additionally, in this embodiment, the reinforcing ribs 64 slope at a substantially constant slope angle, and are formed substantially straight with unchanging cross section over their entire length.

The flexible rubber film portions 60 formed in the diametrical center portion of the movable rubber film 58 have a center rubber film portion 66 provided as a bowed center portion that is curved so as to be convex in one axial direction (upward in FIG. 1). The reinforcing ribs 64 disposed spaced apart from each other in the diametrical center portion are connected to one another by means of this center rubber film portion 66.

The flexible rubber film portions 60, which are divided into generally fan-shaped areas arranged circumferentially between reinforcing ribs 64 situated adjacently in the circumferential direction, have suction-inhibiting portions 68 provided as thick center portions situated in the approximate centers of these areas and having sufficiently greater thickness than the surrounding flexible rubber film portion 60. The suction-inhibiting portions 68 are formed spaced apart from the reinforcing ribs 64, the outside peripheral edge of the movable rubber film 58, and the center rubber film portion 66. That is, the suction-inhibiting portions 68 are formed so as to be completely surrounded about their perimeter by the flexible rubber film portion 60. In this embodiment in particular, the suction-inhibiting portions 68 are formed in the approximate center of the flexible rubber film portions 60, with the flexible rubber film portions 60 forming areas of groove shape extending around the perimeter of each of the suction-inhibiting portions 68.

The movable rubber film 58 constituted in this way is fixedly assembled with the partition member 36 by press-fitting the sleeve fitting 62 into the center recess formed in the partition fitting body 38, and fitting the sleeve fitting 62 within the anchoring groove 56 formed on the bottom face at the outside peripheral edge of the center recess 54.

In the center portion of the lid fitting 40 positioned above the movable rubber film 58 there is formed an upper recess 70 opening in generally inverted conical shape that increases in diameter gradually going downward. The opening of this upper recess 70 is covered by the partition fitting body 38 which is superimposed against the lid fitting 40 in the axial direction, thereby forming a fluid-tight intermediate chamber 72 between the opposed faces of the upper recess 70 and the movable rubber film 58. With this arrangement, the primary fluid chamber in this embodiment is constituted to include the pressure-receiving chamber 44 and the intermediate chamber 72, and the auxiliary fluid chamber in this embodiment is constituted to include the equilibrium chamber 46.

In this embodiment, the reinforcing ribs 64 that make up the movable rubber film 58 are inclined so that the diametrical center side of the movable rubber film 58 gradually extends out to the intermediate chamber 72 side, giving the movable rubber film 58 overall a tapered shape whose diametrical center side gradually extends out to the intermediate chamber 72 side.

At the outside peripheral portion of the lid fitting 40, there is formed a circumferential groove 74 that opens outwardly and extends a prescribed length in the circumferential direction. The opening of the circumferential groove 74 is covered fluid tightly by the partition fitting body 38, forming a fluid passage that constitutes a second orifice passage 76.

A first end of the fluid passage constituting the second orifice passage 76 connects with the pressure-receiving chamber 44 via a hole communicating with the pressure-receiving chamber side (not shown) bored in the axial direction through the lid fitting 40, while the other end of the fluid passage connects with the intermediate chamber 72 through a hole 78 communicating with the intermediate chamber side bored through the side wall of the circumferential groove 74 and extending diametrically inward. By means of this arrangement, the pressure-receiving chamber 44 and the intermediate chamber 72 connect with one another by means of the second orifice passage 76 constituted to include the fluid passage, thus permitting fluid flow between the two chambers 44, 46 through the second orifice passage 76. That is, the second orifice passage 76 is formed spanning the pressure-receiving chamber 44 and the intermediate chamber 72. It should be noted that the first orifice passage 52 and the second orifice passage 76 cooperate to form an orifice passage of the invention in the present embodiment.

The resonance frequency of the fluid caused to flow through the second orifice passage 76 is tuned to a medium frequency range of about 20-40 Hz corresponding to idling vibration and the like, on the basis of resonance action of the fluid. With this arrangement, the second orifice passage 76 is tuned to a higher frequency range than the first orifice passage 52, and when vibration in the medium frequency range is input, will exhibit effective vibration damping effect (vibration insulating effect through low dynamic spring rate) on the basis of resonance action of the fluid caused to flow through the second orifice passage 76.

Tuning of the first and second orifice passages 52, 76 may be accomplished, for example, by adjusting the passage length and passage cross sectional area of each of the orifice passages 52, 76, while giving consideration to the spring rigidity of the walls of the pressure-receiving chamber 44, the equilibrium chamber 46 and the intermediate chamber 72 (a characteristic value corresponding to the pressure change needed to produce a change in unit volume) and the like; typically, the frequencies at which the phase of pressure fluctuations through the orifice passages 52, 76 shift to a state of resonance can be understood to be the tuning frequencies of the orifice passages 52, 76.

Below the movable rubber film 58, there is formed a lower recess 80 of generally conical shape opening into the center portion of the center recess 54 formed in the partition fitting body 38. The opening of this lower recess 80 is covered by the movable rubber film 58, thereby forming a working air chamber 82 provided as a fluid-tight pressure action chamber between the opposed faces of the lower recess 80 and the movable rubber film 58.

An air passage 84 is formed in the partition fitting body 38, with one end of this air passage 84 connecting with the working air chamber 82, and the other end opening into a port 86 formed on the outside peripheral wall of the partition fitting body 38 and exposed to the outside through the air pressure inlete hole 20 formed passing through the peripheral wall of the second mounting member 14. With the mounting installed on a vehicle, an air conduit 88 is connected to the port 86, whereby the pressure in the working air chamber 82 can be regulated from the outside, from the air conduit 88 through the air passage 84.

While one end of the air conduit 88 is connected to the port 86 in the above manner, the other end is connected to a switching valve 90 so that the working air chamber 82 is connected with the switching valve 90 through the air conduit 88. This switching valve 90 consists, for example, of an electromagnetic valve, and the working air chamber 82 can be selectively placed in communication with the atmosphere or with a prescribed negative pressure source. The switching valve 90 can be placed under appropriate switching control depending on vehicle driving conditions and the like, so that in the engine mount 10, effective vibration damping is exhibited against vibration input under various conditions.

The switching valve 90 is connected to a control device, not shown in the drawing. In this control device, necessary items from among information of various kinds indicating the condition of the automobile provided by sensors disposed in the automobile such as the automobile's speed, engine rpm, gear shift position, throttle opening, and so on. On the basis of this information, switching operation of the switching valve 90 is carried out in accordance with a preset program, by microcomputer software or the like. As will be apparent from the preceding description, in this embodiment, an air pressure controller for regulating pressure in the working air chamber 82 from the outside is constituted to include the switching valve 90 and the control device.

Here, a specific embodiment of operation in the engine mount constructed in this manner will be given. Taking into consideration two types of vibration to be damped, namely (1) engine shake which is low-frequency, large-amplitude vibration and (2) idling vibration which is medium-frequency, medium-amplitude vibration, the vibration damping action against each type of vibration will be described.

(1) Vibration Damping of Engine Shake

When low-frequency, large-amplitude vibration such as engine shake is input, flow of fluid between the pressure-receiving chamber 44 and the equilibrium chamber 46 is actively brought about through the first orifice passage 52, which is tuned to the low-frequency range.

Meanwhile, negative pressure is introduced into the working air chamber 82, so that the movable rubber film 58 is constrained by being drawn towards the working air chamber 82 side. Deformation of the movable rubber film 58 when negative pressure is introduced into the working air chamber 82 will now be described in detail.

With the movable rubber film 58 constructed according to this embodiment, where negative pressure is caused to act on the working air chamber 82 so as to suction the movable rubber film 58, first, the flexible rubber film portions 60 and the center rubber film portion 66, which are formed of thin rubber film, readily undergo elastic deformation and are suctioned due to the negative pressure. At this time, the suction-inhibiting portions 68 formed in the approximate center of the flexible rubber film portions 60 and surrounded on all sides by the flexible rubber film portion 60, being relatively thicker than the flexible rubber film portions 60, are much more resistant to elastic deformation than are the flexible rubber film portions 60, and thus experience substantially no elastic deformation when exposed to negative pressure suction, instead undergoing displacement in the axial direction in association with elastic deformation of the surrounding flexible rubber film portions 60. By forming, in the approximate center of flexible rubber film portions 60, these suction-inhibiting portions 68 that are relatively resistant to elastic deformation that undergo elastic deformation relatively easily, it becomes possible to prevent the flexible rubber film portions 60 from being suctioned any more than necessary towards the opening of the working air chamber 82 of the air passage 84. The center rubber film portion 66 is connected at several locations of the outside peripheral portion thereof (four in the present embodiment) to the diametrically center ends of the reinforcing ribs 64 which are about equal in thickness to the suction-inhibiting portions 68. Thus, the center rubber film portion 66, which is formed of film about equally thin as the flexible rubber film portions 60, is supported by the reinforcing ribs 64 which are relatively resistant to elastic deformation, and consequently the movable rubber film 58 can be prevented from being suctioned more than necessary towards the opening of the working air chamber 82 of the air passage 84.

Once the flexible rubber film portions 60 and the center rubber film portion 66 have undergone elastic deformation to the permissible limit, next, the relatively thick reinforcing ribs 64 are made to undergo elastic deformation. Specifically, since the reinforcing ribs 64 have a cantilever design and are separated from one another at the diametrical center, they undergo displacement relatively easily at their diametrical center ends, and experience bowing deformation due to the negative pressure suction. Additionally, since the center rubber film portion 66 has a bowed shape that is convex towards the working air chamber 82 side, when the center rubber film portion 66 is suctioned towards the working air chamber 82 due to negative pressure, the diametrical center ends of the reinforcing ribs 64 are drawn towards the working air chamber 82 side in association with displacement of the center rubber film portion 66, thereby facilitating elastic deformation of the reinforcing ribs 64. While the reinforcing ribs 64 are suctioned by a prescribed extent towards the working air chamber 82, they do not readily undergo elastic deformation in the same way as the center rubber film portion 66 and the flexible rubber film portions 60, whereby the movable rubber film 58 is imparted with suitable rigidity to the due to the rigidity of the reinforcing ribs 64.

Since the movable rubber film 58 is arranged to be suctioned by negative pressure introduced into the working air chamber 82, and to thereby become constrained so as to prevent it from freely undergoing elastic deformation, the movable rubber film 58 which constitutes part of the wall of the intermediate chamber 72 assumes a higher spring constant, and the intermediate chamber 72 assumes higher wall spring rigidity. Consequently, when low-frequency, large-amplitude vibration such as engine shake is input, fluid flow between the pressure-receiving chamber 44 and the intermediate chamber 72 through the second orifice passage 76 is impaired, with the second intermediate chamber 72 becoming substantially blocked off, so that pressure fluctuations produced within the pressure-receiving chamber 44 do not escape due to resonance action of the fluid in the second orifice passage 76 or to fluid pressure absorption by the movable rubber film 58. Accordingly, since an ample level of fluid flow between the pressure-receiving chamber 44 and the equilibrium chamber 46 through the first orifice passage 52 is advantageously assured thereby, there can be effectively achieved vibration attenuating action based on resonance action of fluid caused to flow through the first orifice passage 52, which is tuned to low-frequency, large-amplitude vibration such as engine shake.

(2) Vibration Damping of Idling Vibration

When medium-frequency, medium-amplitude vibration such as idling vibration is input, the first orifice passage 52, which is tuned to a lower frequency range, assumes markedly higher fluid flow resistance due to anti-resonance action, and becomes substantially closed off.

Meanwhile, during input of medium-frequency, medium-amplitude vibration such as idling vibration, the working air chamber 82 is open to the atmosphere through the air passage 84, whereby the movable rubber film 58 is able to undergo elastic deformation without constraint, and the intermediate chamber 72 can readily undergo change in volume. Consequently, pressure fluctuations produced in the pressure-receiving chamber 44 give rise to relative pressure fluctuations between the pressure-receiving chamber 44 and the intermediate chamber 72, and fluid flow is produced through the second orifice passage 76 which is tuned to the medium-frequency region. Accordingly, vibration insulating action is advantageously achieved, based on resonance action of fluid caused to flow through the second orifice passage 76 between the pressure-receiving chamber 44 and the intermediate chamber 82.

When owing to the working air chamber now being open to the atmosphere and consequent relief of negative pressure, the movable rubber film 58 is released from the constrained state by negative pressure from the working air chamber 82, the flexible rubber film portions 60 and the center rubber film portion 66, due to having been made sufficiently thin, will exhibit low recovery force owing and will promptly return to their original shape only with difficulty. With the movable rubber film 58 constructed according to this embodiment, however, the reinforcing ribs 64, which have relatively high recovery force, promptly return to their original shape from the condition of undergoing bowing deformation due to negative pressure. Here, the reinforcing ribs 64 have flexible rubber film portions 60 formed to either side thereof in the circumferential direction, and the center rubber film portion 66 is integrally formed their diametrical center ends. Consequently, through rapid recovery of the reinforcing ribs 64 to their original shape, the flexible rubber film portions 60 and the center rubber film portion 66 can also be immediately restored to their original shape, thereby permitting rapid switching control of the movable rubber film 58 rigidity depending on the frequency of input vibration.

In the fluid-filled type vibration-damping device constructed according to this embodiment, the movable rubber film 58 is formed with thinner portions, namely, the flexible rubber film portions 60 and the center rubber film portion 66, whereby the movable rubber film 58 is imparted with ample flexibility, and will readily undergo elastic deformation when atmospheric pressure is introduced into the working air chamber 82, so that pressure fluctuations in the intermediate chamber 72 can be effectively absorbed.

By forming thick reinforcing ribs 64 that extend in the diametrical direction in the movable rubber film 58, a certain amount of rigidity is imparted to the thin, readily elastically deformable movable rubber film 58, thereby preventing it from undergoing elastic deformation any more than necessary, with a resultant improvement in the durability of the movable rubber film 58, as well as preventing the movable rubber film 58 from being sucked into the opening on the working air chamber 82 side of the air passage 84 which constitutes the inlet for negative pressure and atmospheric pressure. Thus, operation of the film can be stabilized. Additionally, the reinforcing ribs 64 are spaced apart from one another at their diametrical center portions, and the diametrical center ends of the reinforcing ribs 64 are connected with the center rubber film portion 66, with the ends of reinforcing ribs 64 on the center side linked to one another with the center rubber film portion 66 therebetween, and with flexible rubber film portions 60 integrally formed to either side of the reinforcing ribs 64 in the circumferential direction. That is, the reinforcing ribs 64 are formed with a cantilever arrangement in the movable rubber film 58, with the reinforcing ribs 64 relatively easily undergoing displacement on the diametrical center side, and thus undergo bowing deformation. Consequently, by means of forming the reinforcing ribs 64 endowed with relatively high rigidity, the movable rubber film 58 can be inhibited from undergoing more elastic deformation than necessary, so that the desired performance may be adequately achieved.

Flexible thin films, namely the flexible rubber film portions 60 and the center rubber film portion 66, are each integrally formed so as connect with the reinforcing ribs 64. Consequently, it is possible to effectively prevent the film from being drawn more than necessary towards the working air chamber 82 side during negative pressure suction. The reinforcing ribs 64 can advantageously afford recovery force to the original shape when the negative pressure is relieved, so that when the negative pressure is relieved, the film can rapidly resume its original shape, and rapid and reliable switching of rigidity of the movable rubber film 58 can be achieved.

Additionally, by forming the suction-inhibiting portions 68 in the approximate center portions of the flexible rubber film portions 60 situated between the reinforcing ribs 64 in the circumferential direction, the flexible rubber film portions 60 take the form of narrow areas surrounding the perimeters of the suction-inhibiting portions 68. Consequently, excessive elastic deformation in the center portions of the flexible rubber film portions 60 situated furthest away from the reinforcing ribs 64 is effectively prevented, and rupture or other damage to the flexible rubber film portions 60 can be prevented.

Also, the reinforcing ribs 64 impart the movable rubber film 58 with the required rigidity and recovery force, and elastic deformation of the flexible rubber film portions 60 and the center rubber film portion 66 is limited to no more than necessary by means of the reinforcing ribs 64 and the suction-inhibiting portions 68. Thus, limitations as to the thickness dimensions thereof in terms of ensuring the extent of elastic deformation produced and the magnitude of recovery force can be reduced or eliminated, so that the flexible rubber film portions 60 and the center rubber film portion 66 can be made sufficiently thin according to the required flexibility. Consequently, it is possible to employ, as the material for the movable rubber film 58, rubber material having excellent oil resistance, which was difficult to use as material for the movable rubber film 58 in the past owing to its high rubber stiffness. Thus, the movable rubber film 58 endowed with high oil resistance and having adequate flexibility and durability, as well as recovery force can now be achieved.

Figure 4:
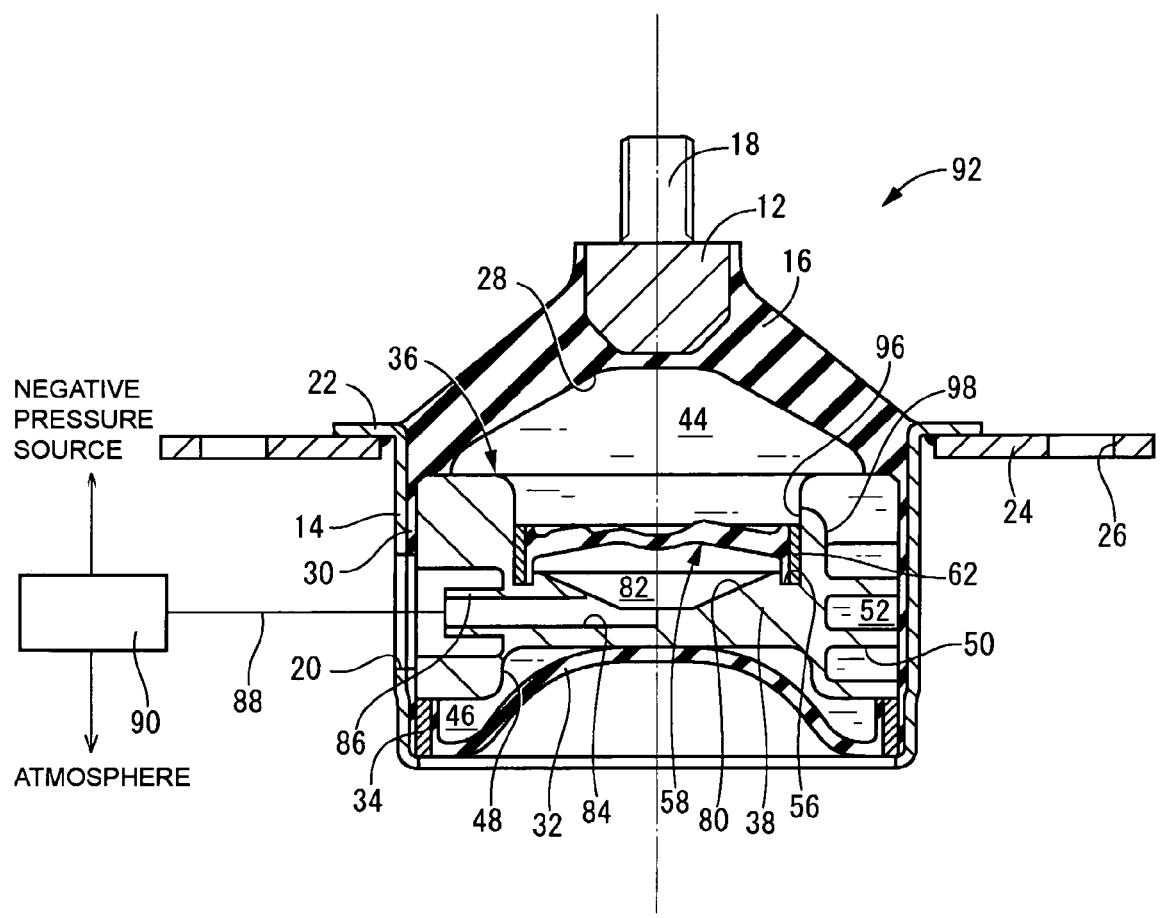
FIG. 4 is an elevational view in axial or vertical cross section of an engine mount of construction according to a second embodiment of the invention, taken along

Referring nest to FIG. 4, there is depicted a fluid-filled vibration damping device in the form of an automobile engine mount 92 as second embodiment of the invention. In the following descriptions, components and areas substantially identical to those in the first embodiment described previously are assigned identical numerals in the drawings, and are not described in any detail.

The engine mount 92 constructed according to this embodiment does not employ the lid fitting 40 of the first embodiment, and in association therewith the intermediate chamber 72 and the second orifice passage 76 constituted in part by the lid fitting 40 are not formed. The movable rubber film 58 is disposed with one face thereof facing the working air chamber 82 as in the first embodiment, with the other face facing into the pressure-receiving chamber 44, and part of the wall of the pressure-receiving chamber 44 being constituted by the movable rubber film 58. Due to elimination of the lid fitting 40, the positioning recess 42 for press fitting the lid fitting 40 is not formed in the center of the upper face of the partition fitting body 94 in the engine mount 92 of this embodiment, and a center recess 96 is formed opening onto the upper face of the partition fitting body 92, constituting a circular recess of greater depth dimension than the center recess 54 of the first embodiment.

In this embodiment, a first end of the first orifice passage 52 communicates with the equilibrium chamber 46 via the hole communicating with the equilibrium chamber side as in the first embodiment, while the other end opens onto the outside circumferential surface of the partition member 36 and communicates with the pressure-receiving chamber 44 through a hole 98 on the pressure-receiving chamber side extending upward in the axial direction.

Here, a specific embodiment of operation of the engine mount 92 having this construction will be given. Taking into consideration two types of vibration to be damped, namely (1) engine shake which is low-frequency, large-amplitude vibration and (2) idling vibration and running booming noise which represent vibration in the medium- to high-frequency region, the vibration damping action against each type of vibration will be described.

(1) Vibration Damping of Engine Shake

When low-frequency, large-amplitude vibration such as engine shake is input, negative pressure is introduced into the working air chamber 82, and the movable rubber film 58 is constrained by being suctioned into the lower recess 80. Consequently, the movable rubber film 58 constituting part of the wall of the pressure-receiving chamber 44 assumes a higher spring constant, and elastic deformation of the movable rubber film 58 is inhibited. This arrangement prevents pressure fluctuations produced within the pressure-receiving chamber 44 from being absorbed through elastic deformation of the movable rubber film 58. Thus, when low-frequency, large-amplitude vibration such as engine shake is input, production of pressure fluctuations within the pressure-receiving chamber 44 is advantageously assured, and the level of fluid flow through the first orifice passage 52 between the pressure-receiving chamber 44 and the equilibrium chamber 46 is advantageously assured, so that vibration attenuation action based on resonance action of fluid caused to flow through the first orifice passage 52 tuned to the low-frequency range of engine shake and the like is effectively achieved.

(2) Vibration Damping of Idling Vibration and Running Booming Noise

When idling vibration, running booming noise or similar vibration in the medium- to high-frequency range higher than the tuning frequency of the first orifice passage 52 is input, the first orifice passage 52, which is tuned to a lower frequency range, assumes markedly higher fluid flow resistance due to anti-resonance action, and becomes substantially closed off. Meanwhile, the working air chamber 82 is open to the atmosphere through the air passage 84, whereby the movable rubber film 58 is able to undergo elastic deformation without constraint. Consequently, pressure fluctuations produced in the pressure-receiving chamber 44 are absorbed on the basis of elastic deformation of the movable rubber film 58, as a result of which a marked rise in dynamic spring constant caused by the first orifice passage 52 becoming substantially closed off is avoided, and good vibration damping effect (vibration insulating effect based on low dynamic spring characteristics) against vibration in the medium- to high-frequency range is achieved. Through appropriate setting of the rigidity of the movable rubber film 58 to effect tuning, it is possible to adjust the vibration damping characteristics in the medium- to high-frequency range.

In the engine mount 92 constructed in accordance with this embodiment as well, as in the engine mount 10 pertaining to the first embodiment discussed previously, ample flexibility of the movable rubber film 58 is assured and fluid pressure absorbing action is effectively exhibited, while damage due to excessive suctioning of the film is avoided making improved durability possible. While on the other hand the movable rubber film 58 is imparted with ample recovery force, rapid, stable switching of film rigidity by means of controlling pressure within the working air chamber 82 can be achieved, and vibration damping performance can be improved.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For instance, in the preceding first and second embodiments, the pressure-receiving chamber 44 and the equilibrium chamber 46 communicate with each other by means of the first orifice passage 52, and the pressure-receiving chamber 44 and the intermediate chamber 72 communicate with each other by means of the second orifice passage 76. However, the invention is not limited to this arrangement. It is instead possible for the invention to be implemented in an engine mount wherein the pressure-receiving chamber 44 and the equilibrium chamber 46 communicate with each other by means of the first orifice passage 52, the intermediate chamber 72 and the equilibrium chamber 46 to communicate with each other by means of the second orifice passage, and the pressure-receiving chamber and the pressure-receiving chamber and the intermediate chamber 72 are substantially in communication by means of transmission of fluid pressure by a movable plate provided as the movable member, disposed with one face positioned in the pressure-receiving chamber 44 and the other face positioned in the equilibrium chamber 46, and undergoing minute displacement in the mounting axis direction (the vertical direction in FIGS. 1 and 4) on the basis of relative pressure fluctuations produced between the pressure-receiving chamber 44 and the intermediate chamber 72.

Figure 5:
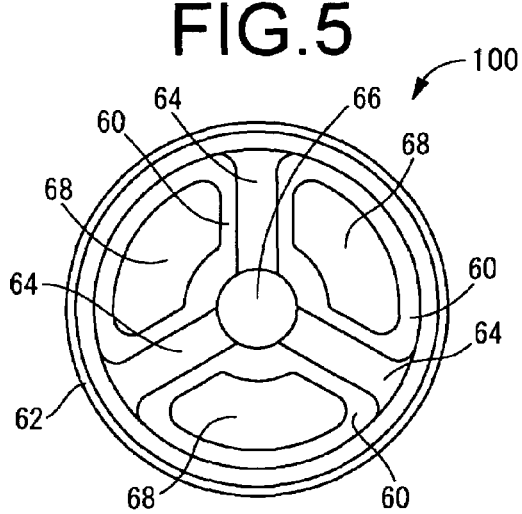
FIG. 5 is a top plane view of an example of elastic rubber film for use in an engine mount of the invention.
Figure 6:
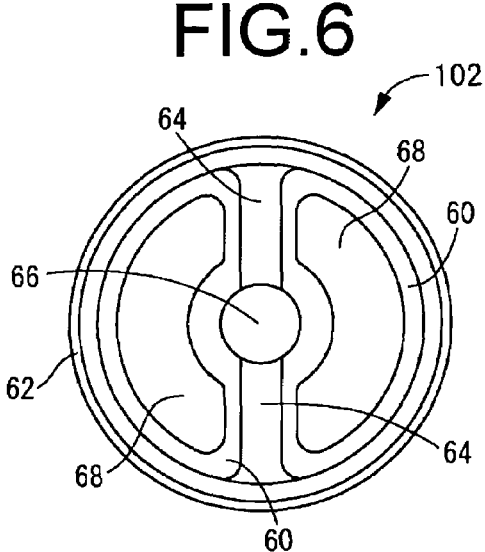
FIG. 6 is a top plane view of another example of elastic rubber film for use in an engine mount of the invention.
Figure 7:
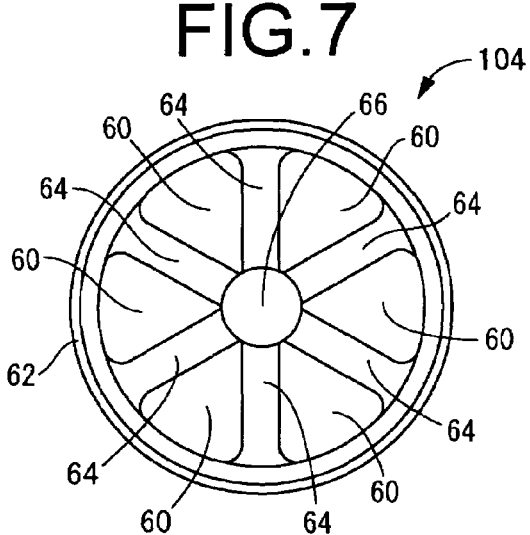
FIG. 7 is a top plane view of yet another example of elastic rubber film for use in an engine mount of the invention.

Also, whereas the preceding first and second embodiments describe a movable rubber film 58 furnished with four reinforcing ribs 64 formed in two mutually orthogonal directions along the diameter, the number of reinforcing ribs 64 so formed is not limited to that taught in the preceding embodiments. Specifically, as depicted in FIGS. 5-7, a movable rubber film 100 furnished with three reinforcing ribs 64, a movable rubber film 102 furnished with two reinforcing ribs 64, or a movable rubber film 104 furnished with six reinforcing ribs 64 could also be employed appropriately.

Additionally, whereas the preceding first and second embodiments describe suction-inhibiting portions 68 relatively thicker than the flexible rubber film portions 60 and situated in the approximate center of the flexible rubber film portions 60 formed between adjacent reinforcing ribs 64 in the circumferential direction, these suction-inhibiting portions 68 are not always necessary, it being possible instead to provide none at all, or to selectively provide them in certain portions only, according to the performance required.

Also, whereas the preceding first and second embodiments describe formation of a single first orifice passage 52 and a single second orifice passage 76, it would be possible to dispose two or more first orifice passages 52 parallel to one another at locations spaced apart in the circumferential direction, and to adopt a similar arrangement for the second orifice passage 76 as well.

That is, the shape, size, construction, location, number and so on of the first and second orifice passages 52, 76 may be modified depending on the required vibration damping characteristics, production considerations, and so on, and are not limited to those taught herein by way of example.

While the present invention has been applied to an automotive engine mount in the illustrated first and second embodiments, it should be appreciated that the principle of the invention can be similarly applied to an automobile body mount, an automobile differential mount, or other vibration damping mount for damping vibration in vibrtive components in various devices other than automobiles.

What is claimed is:

1. A fluid-filled type vibration-damping device for elastically connecting two components making up a vibration transmission system in a vibration damping fashion, the device comprising:
   a first mounting member adapted to be attached to one of the two components;
   a second mounting member adapted to be attached to an other one of the two components;
   a main rubber elastic body elastically connecting the first and second mounting members;
   a primary fluid chamber whose wall is partially constituted by the main rubber elastic body having a non-compressible fluid sealed therein;
   an auxiliary fluid chamber whose wall is partially constituted by a flexible film having the non-compressible fluid sealed therein;
   a partition member supported by the second mounting member and positioned such that the primary fluid chamber and the auxiliary fluid chamber are disposed on either side thereof;
   an orifice passage for permitting a fluid communication between the primary and auxiliary fluid chambers; and
   an elastic rubber film partially defining the wall of the primary fluid chamber at one of opposite surfaces thereof, and partially defining a pressure action chamber at an other one of opposite surfaces thereof, the elastic rubber film being varied in a rigidity by means of negative pressure acting on the pressure action chamber;
   wherein the elastic rubber film is of generally disk shape and bonded at an outer circumferential surface thereof to a fastener sleeve by vulcanization, the fastener sleeve being fastened to the partition member in order to form the pressure action chamber between the partition member and the elastic rubber film, and
   wherein the elastic rubber film includes a plurality of thick reinforcing ribs that are spaced apart from one another in a circumferential direction and extend in a radial direction from an outside peripheral edge over a length not reaching a center so that areas situated between pairs of adjacent reinforcing ribs in the circumferential direction constitutes thin portions formed by a thin rubber elastic body, while the center portion of the elastic rubber film situated between distal ends of the plurality of reinforcing ribs constitutes a bowed center portion that is thinner than the reinforcing ribs and convex towards a pressure action chamber side.

2. A fluid-filled type vibration-damping device according to claim 1, wherein in the elastic rubber film, the areas situated between pairs of adjacent reinforcing ribs in the circumferential direction have a thick center portion in a generally center portion thereof, which is surrounded by a thinner portion.

3. A fluid-filled type vibration-damping device according to claim 1, wherein the reinforcing ribs are formed inclining towards a pressure-receiving chamber side, with substantially unchanging thickness towards a center from an outside peripheral edge of the elastic rubber film.

4. A fluid-filled type vibration-damping device according to claim 1, further comprising an air pressure controller including an air pressure passage formed opening into the pressure action chamber, and adapted to selectively expose the pressure action chamber to atmospheric pressure or negative pressure through the air pressure passage.

5. A fluid-filled type vibration-damping device according to claim 1, wherein the second mounting member is of tubular shape, and the first mounting member is situated spaced apart from a first open end of the second mounting member, with the first and second mounting members connected to each other by the main rubber elastic body thereby providing fluid-tight closure to the first open end of the second mounting member; an other open end of the second mounting member is provided fluid-tight closure by the flexible film; and the partition member is of generally bottomed, round tubular shape disposed opening towards the first mounting member side, with the elastic rubber film disposed in an interior thereof to form the pressure action chamber at a bottom of the partition member, and with an outside peripheral portion of the partition member extending in the circumferential direction to form the orifice passage.

6. A fluid-filled type vibration-damping device according to claim 1, wherein the partition member includes a first partition member and a second partition member, with the primary fluid chamber and the auxiliary fluid chamber being formed to either side of the first partition member, and the primary fluid chamber being partitioned by the second partition member, thereby forming a pressure-receiving chamber whose wall is partially constituted by the main rubber elastic body and in which pressure fluctuations are created during vibration input, and an intermediate chamber whose wall is partially constituted by the elastic rubber film; the primary fluid chamber is constituted by the pressure-receiving chamber and the intermediate chamber; the auxiliary fluid chamber is constituted by an equilibrium chamber whose wall is partially constituted by the flexible film and which readily permits change in volume; and the orifice passage is formed by a first orifice passage connecting the pressure-receiving chamber with the equilibrium chamber and a second orifice passage connecting the pressure-receiving chamber with the intermediate chamber.

7. A fluid-filled type vibration-damping device according to claim 6, wherein the second mounting member is of tubular shape, and the first mounting member is situated spaced apart from a first open end of the second mounting member, with the first and second mounting members connected to one another by the main rubber elastic body thereby providing fluid-tight closure to the first open end of the second mounting member; an other open end of the second mounting member is provided fluid-tight closure by the flexible film; the first partition member is of generally bottomed, round tubular shape disposed opening towards the first mounting member side, with the elastic rubber film disposed in an interior thereof to form the pressure action chamber at a bottom of the first partition member; the second partition member is disposed on an opposite side of the elastic rubber film from the pressure action chamber; an outside peripheral portion of the first partition member extends in the circumferential direction to form the first orifice passage; and an outside peripheral portion of the second partition member extends in the circumferential direction to form the second orifice passage.

8. A fluid-filled type vibration-damping device according to claim 1, wherein the primary fluid chamber is partitioned by a movable member having limited displacement and deformation, thereby forming a pressure-receiving chamber whose wall is partially constituted by the main rubber elastic body and in which pressure fluctuations are produced directly in association with elastic deformation of the main rubber elastic body when vibration is input, and an intermediate chamber whose wall is partially constituted by the elastic rubber film and in which pressure fluctuations are produced by pressure in the pressure-receiving chamber being exerted upon it by the movable member when vibration is input; the primary fluid chamber is constituted by the pressure-receiving chamber and the intermediate chamber; an equilibrium chamber whose wall is partially constituted by the flexible film and which readily permits change in volume, with the auxiliary fluid chamber being constituted by the equilibrium chamber; and the orifice passage is formed by a first orifice passage connecting the pressure-receiving chamber with the equilibrium chamber and a second orifice passage connecting the intermediate chamber with the equilibrium chamber.

9. A fluid-filled type vibration-damping device according to claim 8, wherein the second mounting member is of tubular shape, and the first mounting member is situated spaced apart from a first open end of the second mounting member, with the first and second mounting members connected to each other by the main rubber elastic body thereby providing fluid-tight closure to the first open end of the second mounting member; the other open end of the second mounting member is provided fluid-tight closure by the flexible film; the partition member is of generally bottomed, round tubular shape disposed opening towards the first mounting member side, with the elastic rubber film disposed in the interior thereof to form the pressure action chamber at the bottom of the partition member; the movable member is disposed on the opposite side of the elastic rubber film from the pressure action chamber; and the outside peripheral portions of the elastic rubber film and the movable member extend in the circumferential direction to form the first orifice passage and the second orifice passage.

* * * * *